(12) United States Patent
Viswanath et al.

(10) Patent No.: US 7,904,359 B1
(45) Date of Patent: Mar. 8, 2011

(54) PROVIDING ACCOUNTING SERVICES FOR A COMMUNICATION NETWORK

(75) Inventors: Kaartik Viswanath, Santa Clara, CA (US); Wen-Lin Tsao, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 1572 days.

(21) Appl. No.: 10/354,233

(22) Filed: Jan. 29, 2003

(51) Int. Cl.
*G06Q 40/00* (2006.01)
(52) U.S. Cl. .............. 705/35; 709/225; 709/229
(58) Field of Classification Search .......... 705/67, 705/35; 709/227, 203
See application file for complete search history.

(56) References Cited

U.S. PATENT DOCUMENTS

| | | | |
|---|---|---|---|
| 7,072,962 B2 * | 7/2006 | Hori | 709/224 |
| 2002/0010683 A1 * | 1/2002 | Aune | 705/67 |
| 2003/0212803 A1 * | 11/2003 | Wu et al. | 709/228 |

OTHER PUBLICATIONS

Digital cellular telecommunications system (Phase 2+); General Packet Radio Service (GPRS); GPRS Tunnelling Protocol (GTP) across the Gn and Gp Interface (GSM 09.60 version 7.3.0 Release 1998): Draft ETSI EN 301 347 V7.3.0 (Jan. 2000); European Standard (Telecommuni-cations series); GSM Global System for Mobile Communications; pp. 1-69.

* cited by examiner

*Primary Examiner* — Ojo O Oyebisi
(74) *Attorney, Agent, or Firm* — Baker Botts L.L.P.

(57) ABSTRACT

Providing accounting services for a communication device includes receiving at a support node a context request to create a communication context for the communication device. An accounting request is sent to an accounting server, where the accounting request initiates accounting for the communication device. The support node waits for an accounting response from the accounting server, where the accounting response indicates that the accounting server is operational. The communication context is created for the communication device only if the accounting response is received from the accounting server.

20 Claims, 3 Drawing Sheets

PROVIDING ACCOUNTING SERVICES FOR A COMMUNICATION NETWORK

TECHNICAL FIELD OF THE INVENTION

This invention relates generally to the field of telecommunications and more specifically to providing accounting services for a communication network.

BACKGROUND OF THE INVENTION

Mobile users are often charged for access to a communication network. An accounting server is typically used to provide accounting services for charging users. In certain situations, however, an accounting server may not be aware of users who have accessed a communication network. Consequently, known techniques for providing accounting services for a communication network may be unsatisfactory in some situations.

SUMMARY OF THE INVENTION

In accordance with the present invention, disadvantages and problems associated with previous techniques for providing accounting services may be reduced or eliminated.

According to one embodiment of the present invention, providing accounting services for a communication device includes receiving at a support node a context request to create a communication context for the communication device. An accounting request is sent to an accounting server, where the accounting request initiates accounting for the communication device. The support node waits for an accounting response from the accounting server, where the accounting response indicates that the accounting server is operational. The communication context is created for the communication device only if the accounting response is received from the accounting server.

Certain embodiments of the invention may provide one or more technical advantages. A technical advantage of one embodiment of the present invention may be that a communication device is granted access to a communication network only after a gateway support node has determined that an accounting server is operational. Accordingly, the probability that a communication device is granted access without being charged by the accounting server is reduced. Consequently, more accurate accounting services may be provided.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
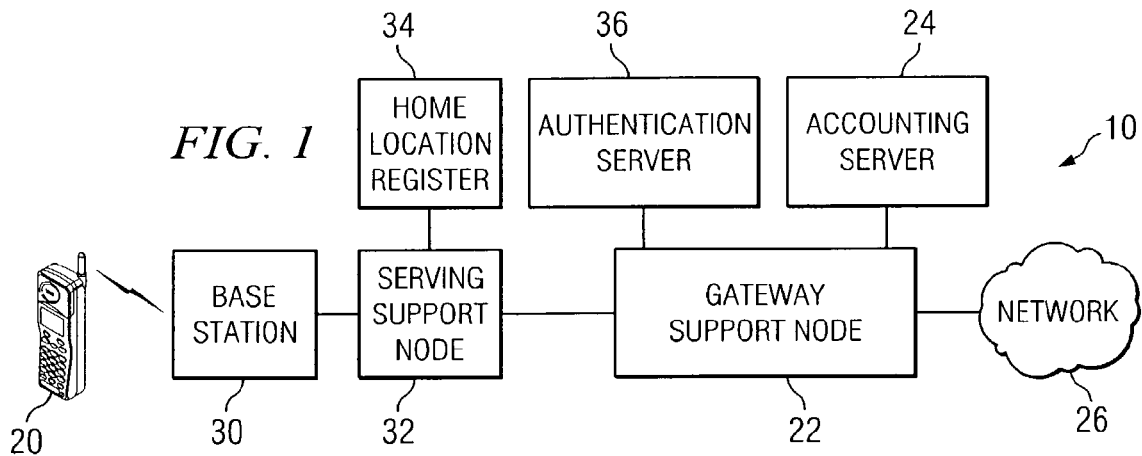
FIG. 1 is a block diagram of one embodiment of a system for providing accounting services for a communication network.

FIG. 1 is a block diagram of one embodiment of a system 10 that provides accounting services for a communication network 26. System 10 includes a gateway support node 22 that determines whether an accounting server 24 is operational prior to granting a communication device 20 access to communication network 26.

In operation, communication device 20 requests the creation of a Packet Data Protocol (PDP) context that allows communication device 20 to access communication network 26. The request for the creation of the PDP context is communicated through a base station 30 and a serving support node 32 to gateway support node 22. Gateway support node 22 determines that accounting server 24 is operational, and then creates the PDP context.

According to the illustrated embodiment, communication device 20 is used to communicate with communication network 26. Communication device 20 may comprise, for example, a personal digital assistant, a cellular telephone, a mobile handset, or any other device suitable for communicating data packets to and from system 10. Communication device 20 may support, for example, simple Internet Protocol (IP), mobile IP, or any other suitable communication protocol. Communication device 20 may utilize, for example, Global System for Mobile communications (GSM) technology or any other suitable mobile communication technology. A call from communication device 20 may comprise data packets communicating information such as data, video, multimedia, any other suitable type of information, or any combination of the preceding.

System 10 may comprise, for example, a General Packet Radio Service (GPRS) or Universal Mobile Telecommunications System (UMTS). System 10 includes base station 30, serving support node 32, a home location register (HLR) 34, gateway support node 22, an authentication server 36, accounting server 24, and communication network 26 coupled as shown in FIG. 1.

Base station 30 provides communication device 20 with access to system 10. Base station 30 includes a base transceiver station and a base station controller. The base transceiver station communicates signals to and from communication device 20. The base station controller manages the operation of the base transceiver station. The wireless link between communication device and base station 30 is typically a radio frequency link that may be cellular in network organization.

Serving support node 32 performs mobility management functions such as mobile subscriber attach/detach for communication devices 20 within its service area. Serving support node 32 detects communication devices 20 within its service area, obtains profile data for subscribers from home location register 34, and records the location of the communication devices 20. Serving support node 32 also detects new communication devices 20 within its service area and processes the registration of new mobile subscribers. Serving support node 32 may be coupled to base station 30 via a frame relay connection. Serving support node 32 may comprise, for example, a serving General Packet Radio System (GPRS) support node (SGSN).

Home location register 34 provides subscriber profiles describing features and services associated with a subscriber, and is used to identify and/or verify a user. Serving support node 32 checks with home location register 34 to determine if a user has access to an access point name requested by the user.

Gateway support node 22 acts as an interface to communication network 26, and creates a PDP context that allows communication device 20 to access communication network 26. Gateway support node 22 routes data from communication network 26 to the serving support node 32, which send the data to communication device 20. One or more gateway support nodes 22 may provide support to one or more serving support nodes 30.

Gateway support node 22 may comprise for example, a gateway GPRS support node (GGSN), and may perform its functions according to any suitable standard such as the European Telecommunication Standards Institute (ETSI) GPRS standards. Gateway support node 22 may support GPRS features such as packet routing and transfers, quality-of-service class to internet quality-of-service mapping, quality-of-service negotiation and handling, mobile authentication through a remote authentication dial-in user service (RADIUS), dynamic IP addressing through a dynamic host configuration protocol (DHCP), network management, and charging data collection. Other features that may be supported include IP routing, IP tunneling, domain name system (DNS) support, DHCP support, and RADIUS support. Gateway support node 22 is described in more detail with reference to FIG. 2.

Authentication server 36 is used to authorize the user of communication device 20. Accounting server 24 provides accounting services to charge the user of communication device 20 for access to communication network 26. Authentication server 36 and accounting server 24 may be implemented as a remote authentication dial-in user service (RADIUS) server. Authentication server 36 and accounting server 24 may use a client/server-base authentication software system that centralizes the administration of user profiles. Gateway support node 22 may act as a client of the software system.

Accounting server 24 sends an accounting response message to gateway support node 22 in response to an accounting request if accounting server 24 is operational. The accounting response message may be implemented by adding or modifying an event for accounting server 24. The event includes a type for an accounting response message that instructs accounting server 24 to send an accounting response message to gateway support node 22 in response to an accounting request if accounting server 24 is operational. The event may include types for responses to other requests such as a request to stop accounting, a request for a periodic update, and a request for new information.

Communication network 26 allows communication device 20 to communicate with other networks or devices. Communication network 26 may comprise a public or private data network, the Internet, a wired or wireless network, a local, regional, or global communication network, other mobile service providers services, enterprise intranets, other suitable communication links, or any combination of the preceding.

Various alterations, additions, or admissions may be made to system 10 without departing from the scope of the invention. For example, the accounting service may be implemented for any suitable scope. The accounting may be implemented using a command with a global scope that enables the service for all communication networks 26. Alternatively, the service may be implemented using a command with an access point scope that enables the service for particular communication networks 26.

Figure 2:
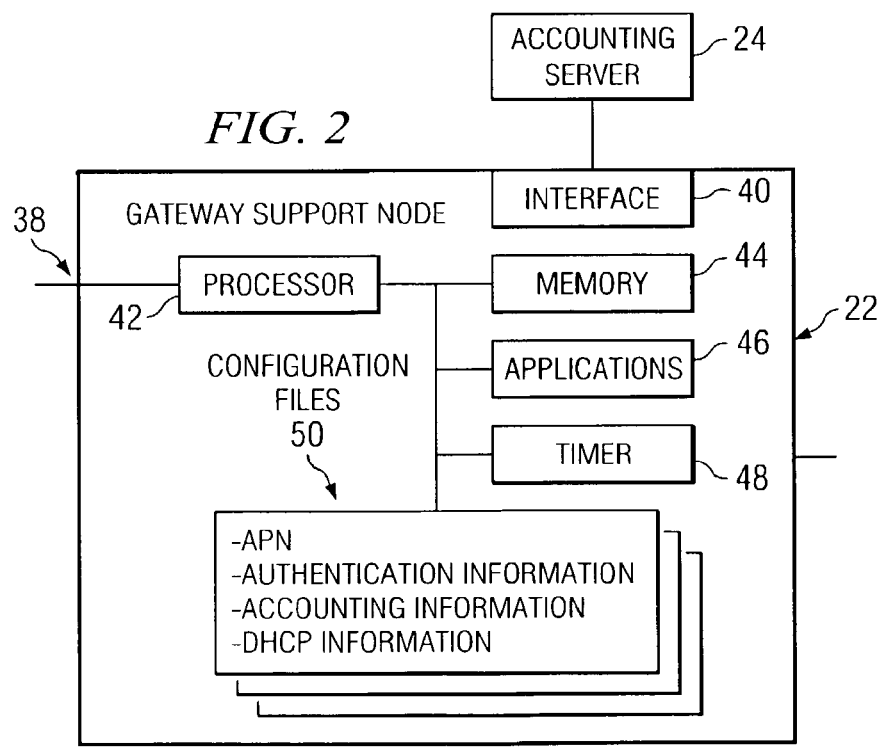
FIG. 2 is a block diagram of one embodiment of a gateway support node of FIG. 1.

FIG. 2 is a block diagram illustrating one embodiment of gateway support node 22 of FIG. 1. Gateway support node 22 determines whether accounting server 24 is operational prior to granting communication device 20 access to communication network 26. Gateway support node 22 includes an input-output 38, an interface 40, a processor 42, a memory 44, applications 46, a timer 48, and configuration files 50.

Input-output 38 sends messages to and receives messages from serving support node 32. Interface 40 allows gateway support node 22 to communicate with accounting server 24. Processor 42 manages the operation of gateway support node 22. Processor 42 receives input, processes the input according to predetermined rules, and produces an output. Memory 44 stores data for gateway support node 22. Applications 46 provides instructions for processor 42. Processor 42 uses timer 48 to determine whether a waiting period for the accounting response has expired.

Configuration files 50 include information for providing access for communication devices 20. Information may include, for example, access point names (APNs) for access points, authentication information, accounting information, and DHCP information. Authentication information includes an identifier such as an IP address for authentication server 36. Accounting information includes an identifier such as an IP address for accounting server 24. DHCP information includes information dynamically assigning IP addresses to communication devices 20. Configuration files 50 may also include a command line interface (CLI) that instructs gateway support node 22 to wait for an accounting response from accounting server 24 before creating a PDP context.

Figure 3:
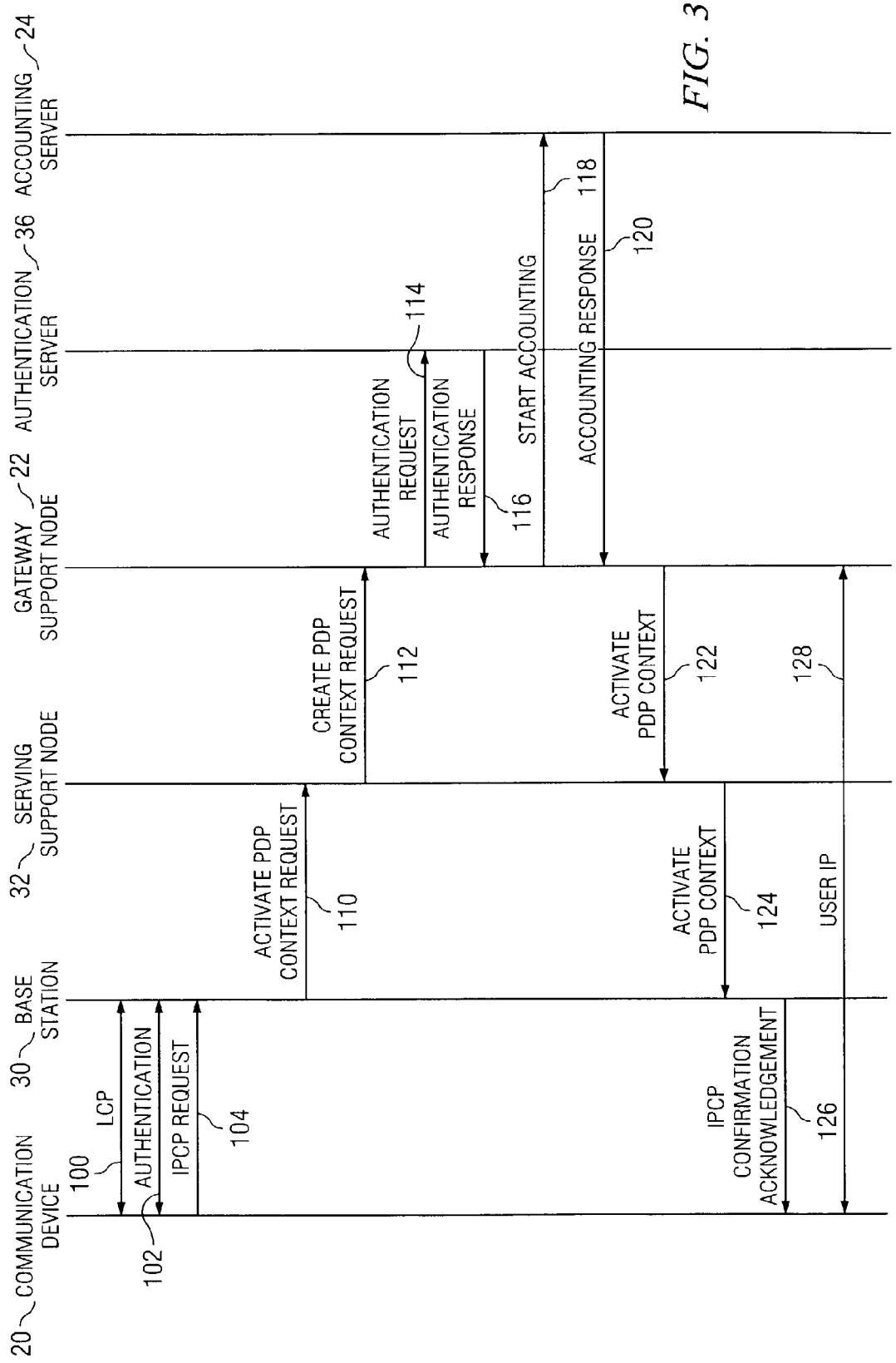
FIG. 3 illustrates one embodiment of a call flow that may be used to provide accounting services for a communication device.

FIG. 3 is a diagram illustrating one embodiment of a call flow that may be used to provide accounting services for communication network 26. The call flow diagram describes messages sent among communication device 20, base station 30, serving support node 32, gateway support node 22, authentication server 36, and accounting server 24.

Communication device 20 and base station 30 exchange link control protocol (LCP) messages at step 100 to establish a communication link. Base station 30 exchanges authentication messages with communication device 20 at step 102 to authenticate communication device 20. Communication device 20 sends an IP control protocol (IPCP) request to base station 30 at step 104 in order to request access to communication network 26. The IPCP request includes an access point name for communication network 26 and an identifier such as an IP address of communication device 20. Base station 30 forwards the request to serving support node 32 in the form of an activate PDP context at step 110.

Serving support node 32 checks with home location register 34 to see if communication device 20 is allowed access to the requested access point name. Serving support node 32 sends a create PDP context request to gateway support node 22 at step 112. The create PDP context request includes information elements such as the access point name and the IP address. Information elements may also include authentication information. Gateway support node 22 sends an authentication request to authentication server 36 at step 114, and authentication server 36 returns an authentication response at step 116. Gateway support node 22 sends a start accounting message to accounting server 24 at step 118. Timer 48 of gateway support node 22 tracks the time until gateway support node 22 receives a response from accounting server 24.

If accounting server 24 is operational, accounting server 24 sends an accounting response at step 120. If gateway support node 22 receives the accounting response before a waiting period has expired, gateway support node 22 continues creation of the PDP context by mapping the identifier of communications device 20 to the access point name. At step 122, gateway support node 22 sends an activate PDP context message to serving support node 32. Serving support node 32 sends an activate PDP context message to base station 30 at step 124, which sends an IPCP confirmation acknowledgement to communication device 20 at step 126. At step 128, communication device 20 communicates with gateway support node to gain access to communication network 26.

Other call flow procedures such as the call flow procedure specified by the European Telecommunications Standards Institute (ETSI) do not check whether accounting server 24 is operational before giving a user access to communication network 26. According to the ETSI standard, serving support node 32 sends a create PDP context request to gateway support node 22, which in turn sends an authentication request to authentication server 36.

Once gateway support node 22 receives an authentication response from authentication server 36, gateway support node 22 sends an activate PDP context response to serving support node 32, which allows the user access to communication network 26. The ETSI standard does not require gateway support node 22 to check whether accounting server 24 is operational prior to creating the PDP context for the user. That is, other call flow procedures allow for a user to access communication network 26 even if accounting server 24 is not able to charge the user for the access.

Figure 4:
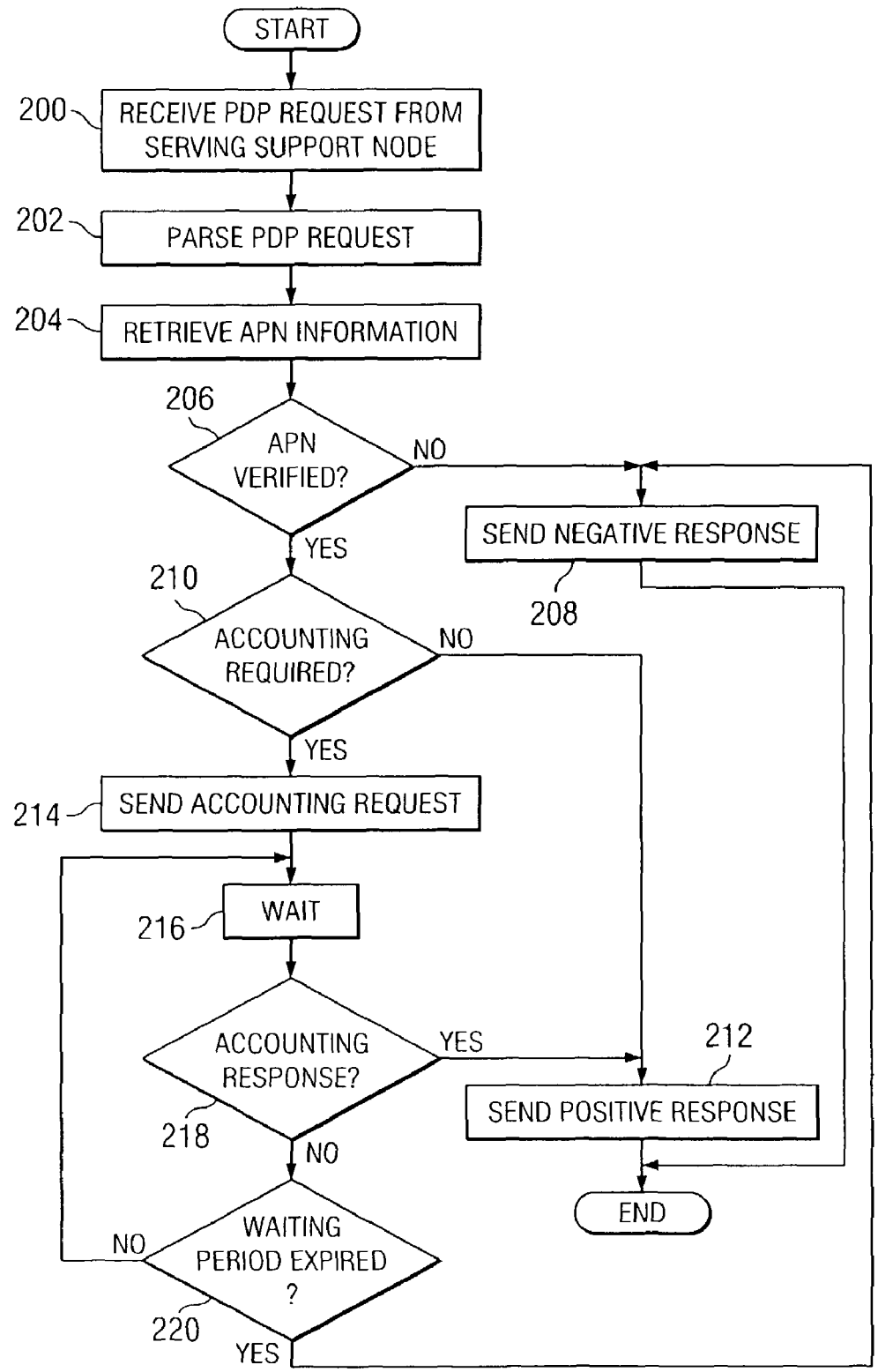
FIG. 4 is a flowchart illustrating one embodiment of a method for providing accounting services to a communication device.

FIG. 4 is a flowchart illustrating one embodiment of a method for providing accounting services for communication network 26. Gateway serving node 22 receives a create PDP context request from support serving node 32 at step 200. The create PDP request is sent from serving support node 32 in response to a request from communication device 20, and includes an access point name for communication network 26 requested by communication device 20.

Processor 42 parses the create PDP context request at step 202. The access point name is retrieved from the create PDP context request at step 204, and is verified at step 206. Gateway serving node 22 may verify the access point name using configuration files 50. If the access point name is not verified at step 206, the method proceeds to step 208, where gateway serving node 22 sends a negative response terminating the creation of the PDP context. After sending the negative response, the method terminates.

If the access point name is verified at step 206, the method proceeds to step 210, where gateway serving node 22 determines whether accounting is required. Gateway serving node may determine whether accounting is required by checking configuration files 50. If accounting is not required at step 210, the method proceeds to step 212, where gateway serving node 22 sends a positive response comprising an activate PDP context message to support serving node 32. After sending the positive response, the method terminates.

If accounting is required at step 210, the method proceeds to step 214. At step 214, gateway serving node 22 sends a start accounting request to accounting server 24. Gateway serving node 22 waits for a response at step 216. Gateway support node 22 determines whether an accounting response has been received from accounting server 24 at step 218. If an accounting response is received at step 218, the method proceeds to step 212, where gateway support node 22 sends a positive response. After sending the positive response, the method terminates.

If an accounting response is not received at step 218, the method proceeds to step 220. Gateway support node 22 determines if a waiting period has expired at step 220. Timer 48 is used to determine whether a waiting period has expired. If the waiting period has not expired, the method returns to step 216, where gateway support node 22 continues to wait for the accounting response. If the waiting period has expired, the method proceeds to step 208, where gateway support node 22 sends a negative response terminating the creation of the PDP context to serving support node 32. After sending the negative response, the method terminates.

Certain embodiments of the invention may provide one or more technical advantages. A technical advantage of one embodiment of the present invention may be that a communication device is granted access to a communication network only after a gateway support node has determined that an accounting server is operational. Accordingly, the probability that a communication device is granted access without being charged by the accounting server is reduced. Consequently, more accurate accounting services may be provided.

Although an embodiment of the invention and its advantages are described in detail, a person skilled in the art could make various alterations, additions, and omissions without departing from the spirit and scope of the present invention as defined by the appended claims.

What is claimed is:

1. A method for providing accounting services for a communication device comprising:
   receiving a context request to create a communication context in a communication network for a communication device;
   sending an accounting request to an accounting server, the accounting request for initiating accounting for the communication device;
   waiting for an accounting response from the accounting server, the accounting response indicating that the accounting server is operational;
   if the accounting response indicating that the accounting server is operational is received from the accounting server, creating the communication context to allow the communication device to access the communication network;
   if the accounting response indicating that the accounting server is operational is not received from the accounting server, terminating creation of the communication context for the communication device to deny the communication device access to the communication network; and
   preventing the communication device from accessing the communication network unless a response indicating that the accounting server is operational is received directly from the accounting server.

2. The method of claim 1, wherein the communication context comprises a Packet Data Protocol context.

3. The method of claim 1, wherein the accounting server comprises a Remote Authentication Dial-In User Service server.

4. The method of claim 1, wherein creating the communication context for the communication device comprises sending an activate Packet Data Protocol context response.

5. The method of claim 1, wherein creating the communication context for the communication device comprises creating the communication context for the communication device if the accounting response is received from the accounting server prior to expiration of a waiting period.

6. The method of claim 1, further comprising:
sending an authentication request to an authentication server;
receiving an authentication response from the authentication server; and
sending the accounting request in response to receiving the authentication response.

7. An apparatus for providing accounting services for a communication device comprising:
an input operable to receive a context request to create a communication context in a communication network for a communication device; and
a processor coupled to the input and operable to:
send an accounting request to an accounting server, the accounting request for initiating accounting for the communication device;
wait for an accounting response from the accounting server, the accounting response indicating that the accounting server is operational;
if the accounting response indicating that the accounting server is operational is received from the accounting server, create the communication context to allow the communication device to access the communication network;
if the accounting response indicating that the accounting server is operational is not received from the accounting server, terminate creation of the communication context for the communication device to deny the communication device access to the communication network; and
prevent the communication device from accessing the communication network unless a response indicating that the accounting server is operational is received directly from the accounting server.

8. The apparatus of claim 7, wherein the communication context comprises a Packet Data Protocol context.

9. The apparatus of claim 7, wherein the accounting server comprises a Remote Authentication Dial-In User Service server.

10. The apparatus of claim 7, wherein the processor is operable to create the communication context for the communication device by sending an activate Packet Data Protocol context response.

11. The apparatus of claim 7, wherein the processor is operable to create the communication context for the communication device by creating the communication context for the communication device if the accounting response is received from the accounting server prior to expiration of a waiting period.

12. The apparatus of claim 7, the processor further operable to:
send an authentication request to an authentication server;
receive an authentication response from the authentication server; and
send the accounting request in response to receiving the authentication response.

13. A logic for providing accounting services for a communication device, the logic recorded on a computer-readable medium and when executed by a computer operable to:
receive a context request to create a communication context in a communication network for a communication device;
send an accounting request to an accounting server, the accounting request for initiating accounting for the communication device;
wait for an accounting response from the accounting server, the accounting response indicating that the accounting server is operational;
if the accounting response indicating that the accounting server is operational is received from the accounting server, create the communication context to allow the communication device to access the communication network;
if the accounting response indicating that the accounting server is operational is not received from the accounting server, terminate creation of the communication context for the communication device to deny the communication device access to the communication network; and
prevent the communication device from accessing the communication network unless a response indicating that the accounting server is operational is received directly from the accounting server.

14. The logic of claim 13, wherein the communication context comprises a Packet Data Protocol context.

15. The logic of claim 13, wherein the accounting server comprises a Remote Authentication Dial-In User Service server.

16. The logic of claim 13, operable to create the communication context for the communication device by sending an activate Packet Data Protocol context response.

17. The logic of claim 13, operable to create the communication context for the communication device by creating the communication context for the communication device if the accounting response is received from the accounting server prior to expiration of a waiting period.

18. The logic of claim 13, further operable to:
send an authentication request to an authentication server;
receive an authentication response from the authentication server; and
send the accounting request in response to receiving the authentication response.

19. A system for providing accounting services for a communication device comprising:
means for receiving a context request to create a communication context in a communication network for a communication device;
means for sending an accounting request to an accounting server, the accounting request for initiating accounting for the communication device;
means for waiting for an accounting response from the accounting server, the accounting response indicating that the accounting server is operational;
means for, if the accounting response indicating that the accounting server is operational is received from the accounting server, creating the communication context to allow the communication device to access the communication network;
means for, if the accounting response indicating that the accounting server is operational is not received from the accounting server, terminating creation of the communication context for the communication device to deny the communication device access to the communication network; and
means for preventing the communication device from accessing the communication network unless a response indicating that the accounting server is operational is received directly from the accounting server.

20. A method for providing accounting services for a communication device comprising:
- receiving a context request to create a communication context in a communication network for a communication device, the communication context comprising a Packet Data Protocol context;
- sending an authentication request to an authentication server;
- receiving an authentication response from the authentication server;
- sending an accounting request to an accounting server, the accounting request for initiating accounting for the communication device, the accounting server comprising a Remote Authentication Dial-In User Service server;
- waiting for an accounting response from the accounting server, the accounting response indicating that the accounting server is operational;
- if the accounting response indicating that the accounting server is operational is received from the accounting server, creating the communication context to allow the communication device to access the communication network only if the accounting response is received from the accounting server prior to expiration of a waiting period by sending an activate Packet Data Protocol context response;
- terminating creation of the communication context by sending a negative response if the accounting response is not received from the accounting server to deny the communication device access to the communication network; and
- preventing the communication device from accessing the communication network unless a response indicating that the accounting server is operational is received directly from the accounting server.

* * * * *